United States Patent Office 2,912,413
Patented Nov. 10, 1959

2,912,413

NON-ELECTROSTATIC STYRENE POLYMER COMPOSITIONS

Massimo Baer, Springfield, Mass., assignor to Monsanto Chemical Company, St. Louis, Mo., a corporation of Delaware No Drawing. Application December 19, 1955
Serial No. 553,728

7 Claims. (Cl. 260—75)

This invention relates to novel styrene polymer compositions. More particularly, the present invention relates to novel styrene polymer compositions which exhibit substantially reduced tendencies to accumulate electrostatic charges.

The problem of developing styrene polymer compositions which are substantially free from the accumulation of electrostatic charges is a problem of long standing in the art. Although numerous proposals have been made as to methods for obtaining this goal, such proposed solutions have met with only indifferent success. In nearly all instances these proposals provide for incorporating in the body of the polymer a polar substance which will change the inherent conductivity of the polymer. While many of these materials provide some reduction in the tendency of the polymer to accumulate an electrostatic charge, the beneficial effect is usually only short-lived and in time the polymer body will again develop strong electrostatic charges.

It is an object of this invention to provide novel styrene polymer compositions.

Another object of this invention is to provide novel styrene polymer compositions having substantially reduced tendencies to accumulate electrostatic charges.

Still another object of this invention is to provide styrene polymer compositions having substantially reduced tendencies to accumulate electrostatic charges and which will retain this reduced tendency over long periods of time.

These and other objects and advantages of the invention will become apparent from the following detailed description thereof.

In accordance with the present invention, there are provided styrene polymer compositions having substantially reduced tendencies to accumulate electrostatic charges by esterifying a polyhydric alcohol of the group consisting of glycerin, pentaerythritol, sorbitol, mannitol, alkylene glycols and polyalkylene glycols with carboxyl groups (or anhydrides thereof) that are provided in styrene polymer chains. A typical example of the compositions of this invention is that obtained by esterifying a styrene-maleic anhydride interpolymer of low maleic anhydride content with a polyethylene glycol, e.g. polyethylene glycol of 400 molecular weight.

The following examples are set forth to illustrate more clearly the principle and practice of this invention to those skilled in the art. All parts are by weight.

EXAMPLE I

*Part A*

One hundred parts of monomer styrene and 0.025 part of di(tertiary butyl) peroxide are admixed in a suitable reaction vessel and heated to 100° C. with stirring. Under these conditions, the rate of polymerization of the styrene is approximately 3% per hour. A second solution is prepared by dissolving 7 parts of maleic anhydride in 28 parts of monomeric styrene. After heating the original mixture of styrene and di(tertiary butyl) peroxide for one-half hour, the addition thereto of the maleic anhydride dissolved in monomeric styrene is started. The addition of maleic anhydride is made slowly and continuously at a uniform rate such that eleven hours are required to complete the addition. Throughout the entire period, the polymerizing mass is maintained at a temperature of 100° C. with constant agitation. The product obtained is a viscous syrup containing approximately 40 weight percent of an interpolymer of styrene and maleic anhydride in styrene monomer. The maleic anhydride content of the interpolymer is approximately 12% with the maleic anhydride content of the composite mixture being approximately 5%. The reaction mass is cooled to room temperature and employed in part B below.

*Part B*

Twenty parts of a polyethylene glycol of 400 molecular weight is dissolved in 100 parts of the product of Example I, part A, this ratio of reactants providing 1 mol of polyethylene glycol for each mol of maleic anhydride contained in the polymer mixture. This mixture is placed in a pressure-resistant container, sealed, and heated over a period of 24 hours with the temperature being gradually increased from 110° C. to 190° C. The product obtained is a hard polymeric material closely resembling polystyrene in its physical properties. The freedom of the product from a tendency to accumulate an electrostatic charge is demonstrated by the fact that a rod molded from the product will not develop a strong electrostatic charge when rubbed with a woolen cloth.

EXAMPLE II

Example I, part B is repeated except that the 78 parts of a polyethylene glycol of 1540 molecular weight is employed per 100 parts of the product of Example I, part A. The product obtained closely resembles that obtained in Example I, part B.

EXAMPLE III

Example II is repeated except that the polyethylene glycol of 1540 molecular weight is replaced with, respectively, stoichiometrically equivalent quantities of glycerin, pentaerythritol, sorbitol and mannitol. In each case the product obtained resembles that obtained in Example II.

The compositions of this invention are styrene polymers which have a polyhydric alcohol of the group consisting of glycerin, pentaerythritol, sorbitol, mannitol, alkylene glycols and polyalkylene glycols chemically bonded to the polymer chain through esterification of carboxyl groups which are provided in the styrene polymer chains. Henceforth, for the sake of convenience, such polyhydric alcohols, which are chemically bonded to the styrene polymer chains through ester groups will be referred to simply as ester groups. The compositions of the invention may consist of either (1) a single styrene interpolymer containing the desired ester groups or (2) a mixture or blend of two or more styrene polymers, one of which is a styrene interpolymer containing the desired ester groups and the second of which is a styrene polymer free of such ester groups.

The desired ester groups may be introduced into the styrene polymer in two principal ways. In the first and preferred method, styrene is interpolymerized with a carboxyl group containing monomer and the resulting polymer is subsequently esterified with the polyhydric alcohol. In the second method, styrene is interpolymerized with a carboxyl group containing monomer that has been esterified previously with the polyhydric alcohol.

In the first method of preparation, the interpolymerization of styrene with the carboxyl group containing monomer can be effected in numerous known methods. Typical examples of the carboxyl group containing monomers that may be itnerpolymerized with the styrene include vinylidene monomers such as acrylic acid, methacrylic acid, crotonic acid, etc. Similarly, the esterification of the carboxyl group containing styrene polymer can be carried out in numerous conventional ways. The simplest method for carrying out such an esterification is to dissolve the carboxyl group containing styrene polymer and polyhydric alcohol in a mutual solvent. Generally, at least one gram mol of the polyhydric alcohol should be employed for each gram mol of carboxyl group (or anhydride thereof) containing monomer included in the styrene polymer. Preferably, the mutual solvent employed should be one which will azeotropically remove the water formed in the esterification.

When preparing the styrene polymer compositions by the first method, it is preferred to interpolymerize the styrene with an anhydride of an alpha,beta-unsaturated polybasic acid such as maleic anhydride or itaconic anhydride. Such interpolymers can be prepared by the method disclosed in my copending application Serial No. 463,621, filed October 20, 1954. When the carboxyl groups are introduced into the styrene polymer through these monomers, the subsequent esterification step can be carried out without the elimination of water.

In the second method for preparing the compositions of the invention, a vinylidene monomer containing an ester group derived from a polyhydric alcohol of the class previously described is prepared and interpolymerized with styrene. For example, methacrylic acid or maleic anhydride may be esterified with a polyhydric alcohol such as diethylene glycol and subsequently interpolymerized with styrene.

Regardless of the method of preparation employed, the compositions of this invention will contain a minimum of at least 50 weight percent styrene and preferably more than 80 weight percent styrene. In addition to styrene and the monomeric units containing the desired ester groups, the compositions may contain small quantities of compounds that are interpolymerizable with styrene such as butadiene, acrylonitrile, acrylate esters and the like. In addition, all or a portion of the styrene may be replaced with its homologues such as alpha-methylstyrene, nuclear substituted chlorostyrenes such as o-chlorostyrene, p-chlorostyrene, 2,4-dicholorostyrene, 2,5-dichlorostyrene, etc., and nuclear alkyl substituted styrenes such as vinyl toluene, p-ethylstyrene, 2,4-dimethylstyrene, 2,5-dimethylstyrene, etc.

The polyhydric alcohols chemically bonded to the styrene polymers are selected from the group consisting of glycerin, pentaerythritol, sorbitol, mannitol, and alkylene glycols conforming to the formula:

$$H(R)_nOH$$

where R is a 1,2 oxyalkylene group and $n$ is a positive integer. Examples of such alkylene glycols include ethylene glycol, propylene glycol, 1,2-butylene glycol and polymeric alkylene glycols such as diethylene glycol, triethylene glycol and tetraethylene glycol. Where the polymeric alkylene glycols contain 4 or more oxyalkylene units, they are customarily identified by their average molecular weight, for example, polyethylene glycol 400, polyethylene glycol 600, etc. Although the monomers, dimers and trimers of alkylene glycols may be employed, it is preferred to employ polyethylene glycols having molecular weights in excess of 200 and more especially polyethylene glycols having molecular weights in excess of 400.

Where the compositions of this invention consist of a blend or mixture of two or more polymers such blends can be prepared by two principal methods. In the first method, the styrene polymers are mixed by mechanical methods such as by blending the polymers on two roll rubber mills, Banbury mixers, extruders or other conventional plastic working equipment. In the special case of where the two polymers to be blended are prepared in the form of a latex, the latexes of the polymers may be mixed before the polymers are separated therefrom. In the second distinct method of preparation, the styrene interpolymer containing the desired ester groups is incorporated in monomeric styrene and the entire mixture is subsequently heated to polymerize the styrene.

The compositions of this invention have physical properties which correspond in all principal properties to polystyrene and can be used essentially interchangeably with polystyrene in all applications except, of course, where high electrical insulating properties are required. In addition, the compositions of this invention can be used in many fields where polystyrene is inapplicable because of its strong tendency to develop an electrostatic charge.

The above descriptions and particularly the examples are set forth by way of illustration only. It will be obvious to those skilled in the art that many variations and modifications thereof can be made without departing from the spirit and scope of the invention herein disclosed.

What is claimed is:

1. A high molecular weight solid thermoplastic interpolymer of at least 80 weight percent of monomeric units of a vinylidene aromatic compound of the group consisting of styrene, alpha-methylstyrene, nuclear chlorostyrenes, nuclear alkylstyrenes and mixtures thereof and less than 20 weight percent of monomeric units of an acid monomer of the group consisting of alpha-beta ethylenically unsaturated monocarboxylic acids, alpha-beta ethylenically unsaturated dicarboxylic acids, anhydrides of alpha-beta ethylenically unsaturated dicarboxylic acids and mixtures thereof; each molar portion of the acid monomer included in the interpolymer being esterified with at least about 1 molar portion of a polyhydric alcohol of the group consisting of glycerin, pentaerythritol, sorbitol, mannitol and alkylene glycols conforming to the formula:

$$H(R)_nOH$$

where R is a 1,2 oxyalkylene group containing up to 4 carbon atoms and $n$ is a positive integer.

2. A composition as in claim 1 in which the interpolymer employed is an interpolymer of styrene.

3. A composition as in claim 1 in which the polyhydric alcohol employed to esterify the interpolymer is an alkylene glycol conforming to the formula:

$$H(R)_nOH$$

where R is a 1,2 oxyalkylene group containing up to 4 carbon atoms and $n$ is a positive integer.

4. A composition as in claim 3 in which the alkylene glycol is a polyethylene glycol having an average molecular weight of at least 200.

5. A high molecular weight solid thermoplastic interpolymer of at least 80 weight percent of styrene and less than 20 weight percent of maleic anhydride, each molar portion of the maleic anhydride in the interpolymer being esterified with at least about 1 molar portion of a polyhydric alcohol of the group consisting of glycerin, pentaerythritol, sorbitol, mannitol and alkylene glycols conforming to the formula:

$$H(R)_nOH$$

where R is a 1,2 oxyalkylene group containing up to 4 carbon atoms and $n$ is a positive integer.

6. A composition as in claim 5 in which the polyhydric alcohol employed to esterify the interpolymer is an alkylene glycol conforming to the formula:

$$H(R)_nOH$$

where R is a 1,2 oxyalkylene group containing up to 4 carbon atoms and $n$ is a positive integer.

7. A composition as in claim 6 in which the alkylene glycol is a polyethylene glycol having an average molecular weight of at least 200.

References Cited in the file of this patent

UNITED STATES PATENTS

| | | |
|---|---|---|
| 2,047,398 | Voss et al. | July 13, 1936 |
| 2,324,739 | Stoops et al. | July 20, 1943 |
| 2,393,863 | Myers | Jan. 29, 1946 |
| 2,561,313 | Malinowski | July 17, 1951 |
| 2,576,915 | Barrett | Dec. 4, 1951 |
| 2,628,176 | Simon et al. | Feb. 10, 1953 |

OTHER REFERENCES

Boundy et al.: Styrene—Its Polymers, Copolymers and Derivatives, Reinhold (1952), pages 862–863. (Copy in Sci. Lib.)